(12) United States Patent
Wayman et al.

(10) Patent No.: US 7,812,254 B2
(45) Date of Patent: Oct. 12, 2010

(54) SOLAR SHIELDS

(75) Inventors: Michael J. Wayman, Waconia, MN (US); Michael J. Nelson, Prior Lake, MN (US); Kevin Thompson, Chaska, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 212 days.

(21) Appl. No.: 12/137,313

(22) Filed: Jun. 11, 2008

(65) Prior Publication Data

US 2009/0311463 A1 Dec. 17, 2009

(51) Int. Cl.
*H02G 3/08* (2006.01)
*H05K 5/00* (2006.01)

(52) U.S. Cl. .................. 174/50; 361/616; 312/109

(58) Field of Classification Search .......... 174/50; 361/616, 796; 312/223.1, 109, 326
See application file for complete search history.

(56) References Cited

U.S. PATENT DOCUMENTS

| | | | |
|---|---|---|---|
| 3,987,655 A | 10/1976 | Myotte | |
| 4,166,195 A | 8/1979 | Schwab | |
| 4,308,742 A | 1/1982 | Harrison et al. | |
| 4,371,757 A | 2/1983 | Debortoli et al. | |
| 4,549,602 A | 10/1985 | Espinoza | |
| 4,742,864 A | 5/1988 | Duell et al. | |
| 4,861,077 A | 8/1989 | Welkey | |
| 5,134,250 A | 7/1992 | Caveney et al. | |
| 5,157,577 A * | 10/1992 | Balaud et al. | ............... 361/724 |
| 5,267,762 A | 12/1993 | Gromotka | |
| 5,445,787 A | 8/1995 | Friedman et al. | |
| 5,490,408 A | 2/1996 | Ando et al. | |
| 5,710,804 A | 1/1998 | Bhame et al. | |
| 5,806,948 A | 9/1998 | Rowan, Sr. et al. | |
| 5,894,407 A | 4/1999 | Aakalu et al. | |
| 5,905,244 A * | 5/1999 | Smith et al. | .................. 218/155 |
| 5,946,193 A | 8/1999 | Hendrix et al. | |
| 6,065,612 A | 5/2000 | Rinderer | |
| 6,082,441 A | 7/2000 | Boehmer et al. | |
| 6,116,615 A | 9/2000 | Trehan | |
| 6,142,595 A | 11/2000 | Dellapi et al. | |
| 6,229,707 B1 * | 5/2001 | Keenan et al. | ............... 361/724 |
| 6,238,027 B1 | 5/2001 | Kohler et al. | |
| 6,253,834 B1 | 7/2001 | Sterner | |
| 6,280,232 B1 | 8/2001 | Beecher et al. | |
| 6,310,772 B1 | 10/2001 | Hutchison et al. | |
| 6,340,317 B1 | 1/2002 | Lin | |
| 6,452,810 B1 * | 9/2002 | Wilcox | ........................ 361/796 |
| 6,465,561 B1 | 10/2002 | Yarbrough et al. | |
| 6,469,911 B1 | 10/2002 | Brown et al. | |
| 6,512,669 B1 * | 1/2003 | Goodwin et al. | ............ 361/601 |
| 6,556,443 B1 | 4/2003 | Wei | |

(Continued)

*Primary Examiner*—Hung V Ngo
(74) *Attorney, Agent, or Firm*—Fogg & Powers LLC

(57) ABSTRACT

Systems and methods for providing solar shields are provided. In one embodiment, a solar shield system includes at least one solar shield having a first set of snap-fit features positioned on the first solar shield to engage with attachment channels of an enclosure; at least one solar shield cover having a flexible hinge integrated therein, the at least one solar shield cover further includes a second set of snap-fit features for coupling the at least one solar shield cover with the at least one solar shield; and a plurality of fastening devices for securing the at least one solar shield and the at least one solar shield cover to the attachment channels of the enclosure.

14 Claims, 4 Drawing Sheets

U.S. PATENT DOCUMENTS

| | | |
|---|---|---|
| 6,579,029 B1 | 6/2003 | Sevde et al. |
| 6,621,712 B2 * | 9/2003 | Siira et al. .................. 361/796 |
| 6,788,535 B2 | 9/2004 | Dodgen et al. |
| 6,968,647 B2 | 11/2005 | Levesque et al. |
| 6,972,367 B2 | 12/2005 | Federspiel et al. |
| 6,995,978 B2 | 2/2006 | Strauss |
| 7,027,300 B2 | 4/2006 | Lord |
| 7,032,277 B2 | 4/2006 | Rolla et al. |
| 7,225,586 B2 | 6/2007 | Levesque et al. |
| 7,245,485 B1 | 7/2007 | Morrell |
| 7,355,848 B1 | 4/2008 | Hodge et al. |
| 7,450,382 B1 | 11/2008 | Fischer et al. |
| 7,495,169 B2 * | 2/2009 | Adducci et al. ............... 174/50 |
| 2003/0016515 A1 * | 1/2003 | Jackson et al. .............. 361/796 |
| 2003/0031002 A1 * | 2/2003 | Siira et al. .................. 361/796 |
| 2004/0112623 A1 | 6/2004 | L'Henaff et al. |
| 2004/0121132 A1 | 6/2004 | Slyne |
| 2004/0222517 A1 | 11/2004 | Robertson et al. |
| 2006/0158866 A1 * | 7/2006 | Peterson et al. ............. 361/796 |
| 2006/0246276 A1 | 11/2006 | Chung |
| 2007/0247809 A1 | 10/2007 | McClure |
| 2008/0238270 A1 | 10/2008 | Wayman et al. |
| 2008/0239632 A1 | 10/2008 | Wayman |
| 2008/0278912 A1 | 11/2008 | Zavadsky et al. |

\* cited by examiner

INSTALLED SOLAR SHIELDS (OPEN COVER)

INSTALLED SOLAR SHIELDS (CLOSED COVER)

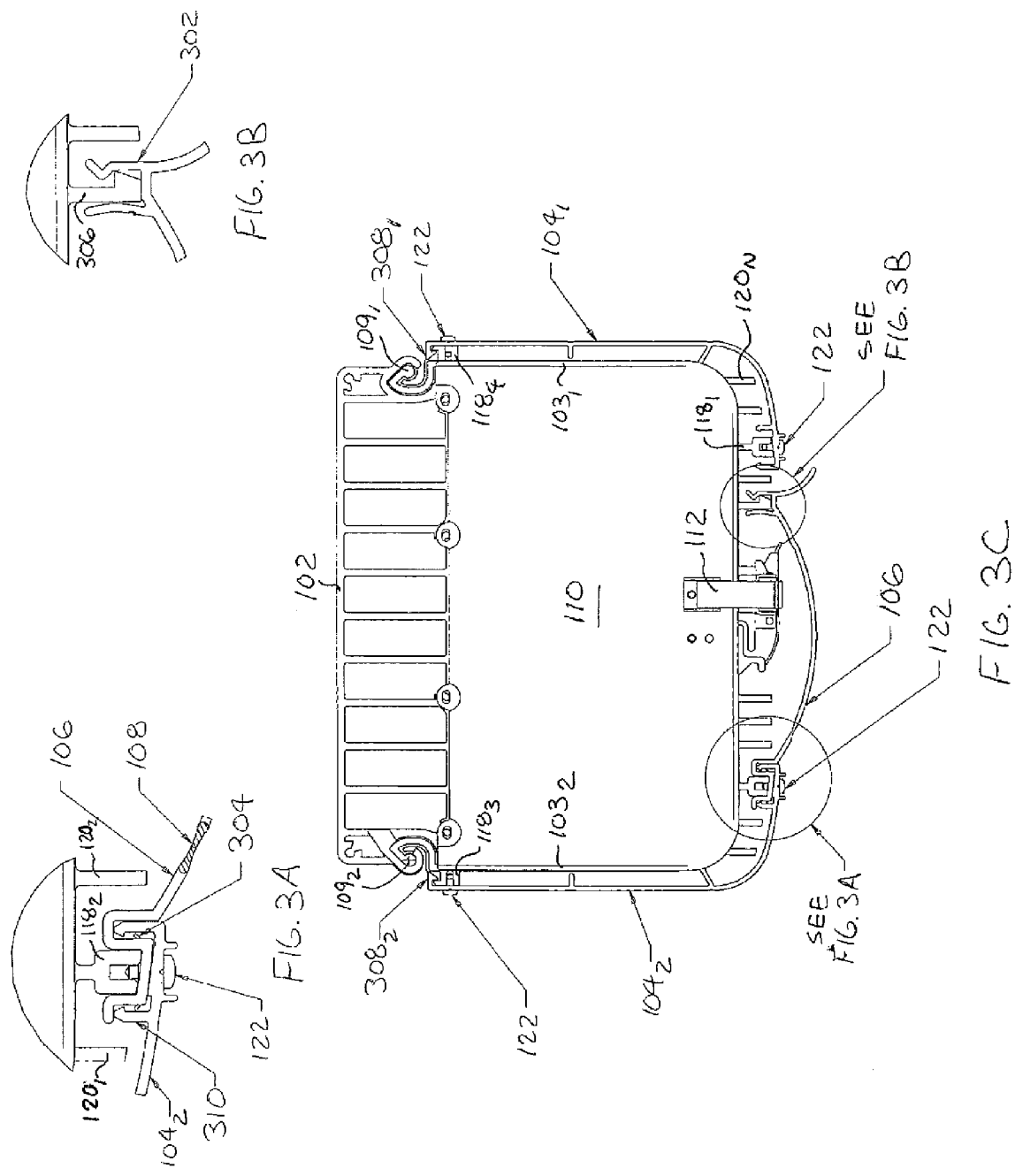

SOLAR SHIELDS

CROSS REFERENCE TO RELATED APPLICATIONS

This application is related to the following co-pending and commonly assigned United States Patent Applications, filed on even date herewith, each of which is incorporated herein by reference in its entirety:

U.S. patent application Ser. No. 12/137,322 entitled "COMMUNICATION MODULES") and which is referred to here as the '1027 application;

U.S. patent application Ser. No. 12/137,297 entitled "APPARATUS FOR MOUNTING A MODULE AND ENABLING HEAT CONDUCTION FROM THE MODULE TO THE MOUNTING SURFACE") and which is referred to here as the '1028 application;

U.S. patent application Ser. No. 61/060,589 entitled "SUSPENSION METHOD FOR COMPLIANT THERMAL CONTACT OF ELECTRONIC MODULES") and which is referred to here as the '1029 application;

U.S. patent application Ser. No. 12/137,307 entitled "ANGLED DOORS WITH CONTINUOUS SEAL") and which is referred to here as the '1030 application;

U.S. patent application Ser. No. 61/060,523 entitled "L-SHAPED DOOR WITH 3-SURFACE SEAL FOR ENDPLATES") and which is referred to here as the '1031 application;

U.S. patent application Ser. No. 61/060,576 entitled "L-SHAPED DOORS WITH TRAPEZOIDAL SEAL") and which is referred to here as the '1032 application;

U.S. patent application Ser. No. 12/137,309 entitled "SYSTEMS AND METHODS FOR VENTURI FAN-ASSISTED COOLING") and which is referred to here as the '1033 application;

U.S. patent application Ser. No. 61/060,547 entitled "COMBINATION EXTRUDED AND CAST METAL OUTDOOR ELECTRONICS ENCLOSURE") and which is referred to here as the '1034 application;

U.S. patent application Ser. No. 61/060,584 entitled "SYSTEMS AND METHODS FOR CABLE MANAGEMENT" and which is referred to here as the '1035 application;

U.S. patent application Ser. No. 61/060,581 entitled "CAM SHAPED HINGES") and which is referred to here as the '1037 application;

U.S. patent application Ser. No. 61/060,501 entitled "APPARATUS AND METHOD FOR BLIND SLOTS FOR SELF DRILLING/SELF-TAPPING SCREWS") and which is referred to here as the '1039 application;

U.S. patent application Ser. No. 61/060,593 entitled "SYSTEMS AND METHODS FOR THERMAL MANAGEMENT") and which is referred to here as the '1040 application;

U.S. patent application Ser. No. 61/060,762 entitled "SERF BOARD COMPONENTS") and which is referred to here as the '1062 application; and U.S. patent application Ser. No. 61/060,740 entitled "PULL-OUT SHELF FOR USE IN A CONFINED SPACE FORMED IN A STRUCTURE") and which is referred to here as the '1064 application.

BACKGROUND

Outdoor telecommunications enclosures that contain high-power electronic components require solar radiation protection to prevent excessive heat from accumulating on and within the enclosures. At the same time, it is often necessary to secure the electronic components in the outdoor enclosure to prevent tampering with the electronic components and to protect the electronic components from the outside environment.

Generally, these outdoor enclosures are subject to two forms of heat: heat generated by the electronic components and from the solar radiation mentioned above. In most cases, the high-power electronic components attach to one or more heat sinks. The heat sinks pass the heat energy generated from the components to any outer surface areas of the outdoor enclosure. However, increasing amounts of the internally generated heat energy, in addition to any accumulation of the solar radiation energy on the exterior of the outdoor enclosure, becomes detrimental to the performance of the electronic components within the outdoor enclosure over a period of time.

To date, attempts to mitigate the incremental effect of accumulating solar heat energy by enlarging the enclosure and the solar shield footprint have resulted in additional manufacturing costs for the enclosure. Moreover, enlargement of the solar shield footprint typically increases the weight of the enclosure and further reduces access to the enclosure, depending on the type of solar shielding material used for the solar shields. Thus, there is a need in the art for improvements in solar shields for outdoor electronics enclosures.

SUMMARY

The following specification provides for solar shields for outdoor electronics enclosures. This summary is made by way of example and not by way of limitation. It is merely provided to aid the reader in understanding some aspects of at least one embodiment described in the following specification.

In one embodiment, a solar shield system comprises at least one solar shield having a first set of snap-fit features positioned on the first solar shield to engage with attachment channels of an enclosure; at least one solar shield cover having a flexible hinge integrated therein, the at least one solar shield cover further comprises a second set of snap-fit features for coupling the at least one solar shield cover with the at least one solar shield; and a plurality of fastening devices for securing the at least one solar shield and the at least one solar shield cover to the attachment channels of the enclosure.

BRIEF DESCRIPTION OF THE DRAWINGS

These and other features, aspects, and advantages are better understood with regard to the following description, appended claims, and accompanying drawings where:

FIGS. 3A, 3B and 3C are plan views of an embodiment of an electronics enclosure having solar shields.

The various described features are drawn to emphasize features relevant to the embodiments disclosed. Like reference characters denote like elements throughout the figures and text of the specification.

DETAILED DESCRIPTION

Embodiments disclosed herein relate to solar shields for an outdoor electronics enclosure. In one embodiment, the solar shields are constructed from a lightweight, plastic-like material during an extrusion process. The extrusion process allows for constructing relatively inexpensive solar shields with varying dimensions that match a profile for one or more similarly extruded access panels of the outdoor electronics enclosure. In addition, the solar shields discussed herein comprise a snap-fit installation for mounting to the access panels, and a flexible hinge system that provides for convenient access to electronic components housed within the outdoor electronics enclosure when necessary.

Figure 1:
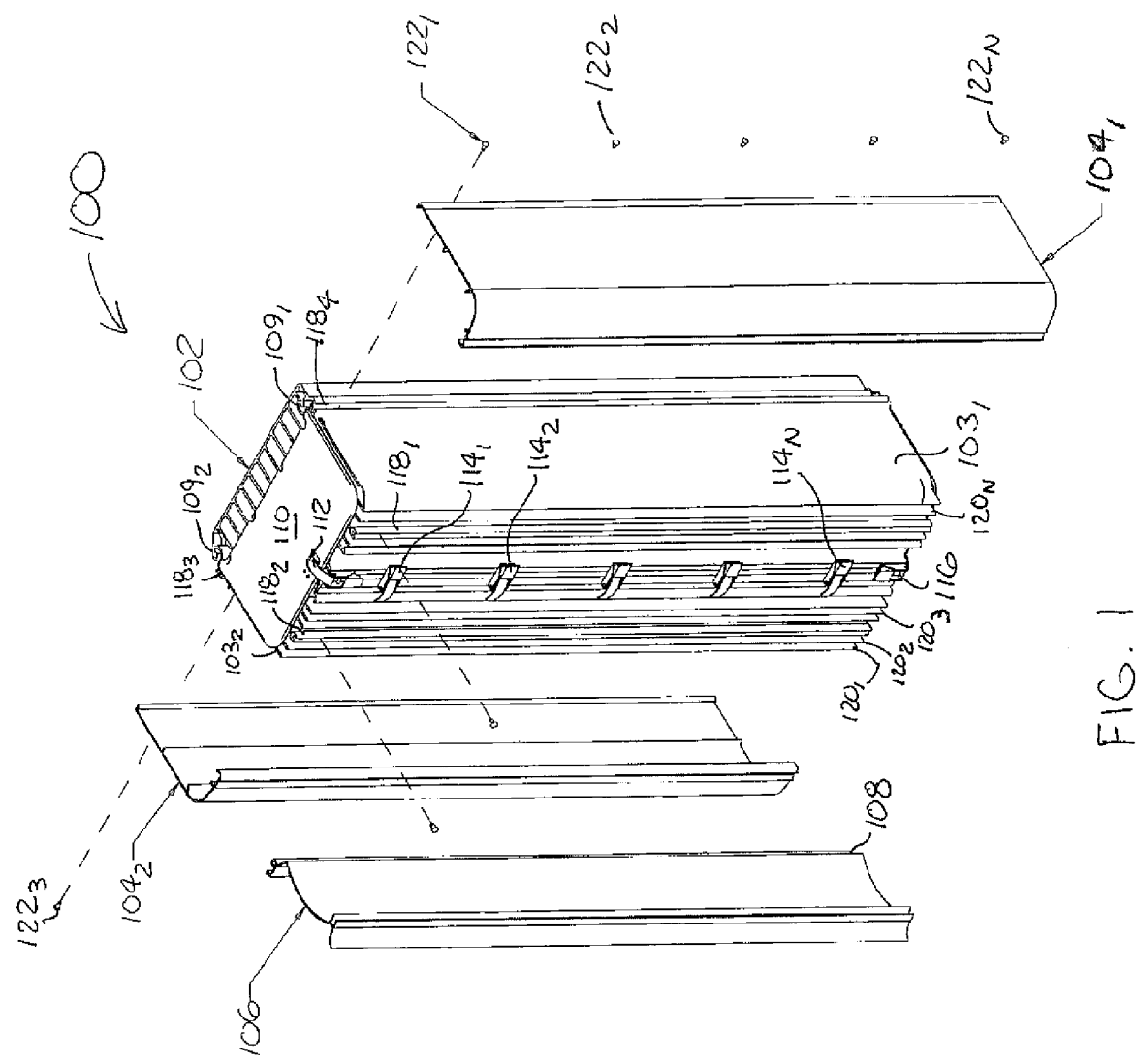
FIG. 1 is an exploded perspective view of an embodiment of a solar shield system for an electronics enclosure.

FIG. 1 is an exploded perspective view of an embodiment of a solar shield system for an electronics enclosure 100. In the example embodiment of FIG. 1, the enclosure 100 comprises a frame 102 having a plurality of sides, and a top plate 110 on the frame 102, the top plate 110 having at least an upper surface. In one implementation, at least one side of the frame 102 is fabricated from an extrusion profile for the electronics enclosure 100, similar to the extrusion profile disclosed in the '1034 and '1040 applications. The enclosure 100 further comprises at least one pair of access panels $103_1$, and $1032_2$, movably attached to at least two opposing vertical sides of the frame 102 and perpendicular to the top plate 110. In one implementation, a top access latch 112 secures the access panels $103_1$ and $103_2$ to the top plate 110, and a series of access latches $114_1$ to $114_N$ secure the access panels $103_1$ and $103_2$ together. In addition, a bottom access latch 116 secures the access panels 103 to a bottom plate (not shown) of the frame 102.

The access panels $103_1$ and $103_2$ are attached to the frame 102 using a series of installation snap-fit features, as further discussed below with respect to FIG. 3C. In addition, each of the access panels $103_1$ and $103_2$ pivotally rotate on hinges $109_1$, and $109_2$, respectively. In one embodiment, the hinges $109_1$ and $109_2$ on the frame 102 are similar to the hinges disclosed in the '1037 application.

As shown in FIG. 1, at least one pair of access panels $103_1$ and $103_2$ include attachment channels $118_1$ to $118_N$ and heat transfer fins $120_1$ to $120_N$. In one embodiment, an extrusion process for the access panels 103 forms the attachment channels $118_1$ to $118_N$ and the heat transfer fins $120_1$ to $120_N$, similar to the extrusion profile process disclosed in the '1030, '1031, and '1032 applications. As shown in further detail below with respect to FIGS. 3A and 3C, the extrusion process for the access panels $103_1$ and $103_2$ positions the heat transfer fins $120_1$ to $120_N$ around the attachment channels $118_1$ and $118_2$. It is understood that the enclosure 100 is capable of accommodating any appropriate number of attachment channels $118_1$ to $118_N$ and heat transfer fins $120_1$ to $120_N$ (for example, one or more attachment channels 118 and heat transfer fins 120) for a single enclosure 100.

The solar shield system for the electronics enclosure 100 comprises first and second side shields $104_1$ and $104_2$ and a cover shield 106. In one embodiment, the side shields $104_1$ and $104_2$ and the cover shield 106 comprise an extruded plastic material suitable for use as a solar shield material. The side shields $104_1$ and $104_2$ and the cover shield 106 are snap-fit solar shields fabricated using at least one extrusion profile process. In particular, the extrusion profile provides side shields $104_1$ and $104_2$ with a common profile so that either can be used with either of the access panels $103_1$ or $103_2$ by simply flipping reorienting the shield as appropriate. In one embodiment shields $104_1$ and $104_2$ are both pushed through the same profile form when extruded. As shown in FIG. 1, the solar shields $104_1$ and $104_2$ have a, generally "L"-shaped profile to match the profile of the outer surfaces of the access panels $103_1$ and $103_2$, respectively. The first solar shield $104_1$ follows an outer surface of the access panel $103_1$. The second solar shield $104_2$ follows an outer surface of the access panel $103_2$. In one implementation, the solar shields 104 extend around and over one or more edges of the outer surface of the access panels 103.

Figure 2A:
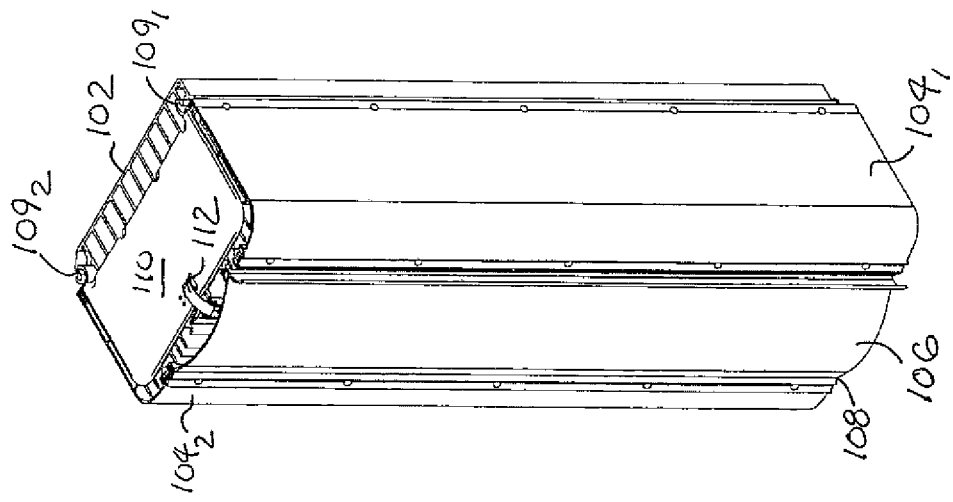
FIGS. 2A and 2B are elevated perspective views of an embodiment of an electronics enclosure having solar shields.
Figure 2B:
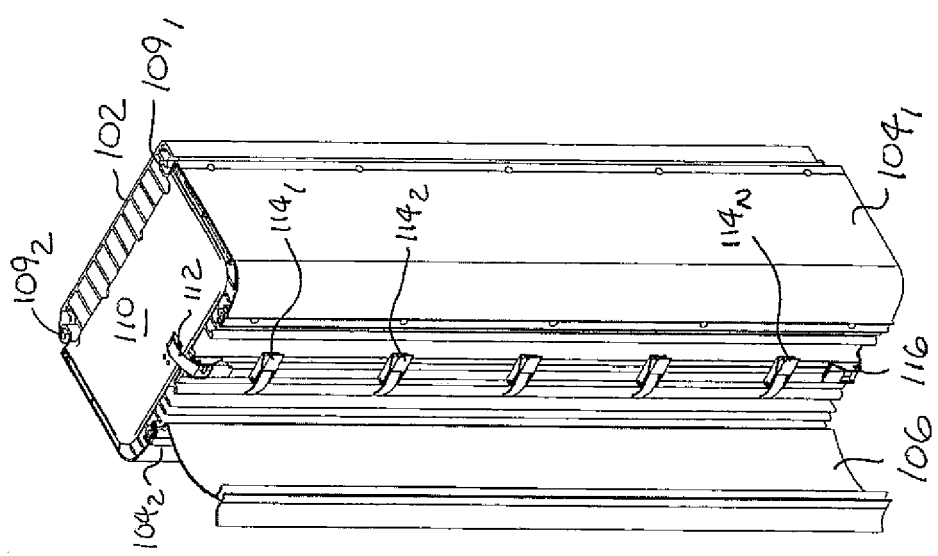

FIGS. 2A and 2B are elevated perspective views of one embodiment of an electronics enclosure having the solar shield system described with respect to FIG. 1. As shown, solar shield $104_1$ attaches to and engages with the access panel $103_1$ using snap-fit features described below. Solar shield $104_2$ similarly attaches to and engages with the access panel $103_2$ using snap-fit features described below. Cover shield 106 couples to solar shield $104_1$ to form an access door to latches 112, 114 and 116. The cover shield 106 is a snap-fit solar shield that comprises a flexible hinge 108, shown in greater detail in FIG. 3A. The flexible hinge 108 allows the cover shield 106 to rotatably pivot. The cover shield 106 functions as an access door to both protect the latches 112, 114 and 116 (when the cover shield 106 is closed) and provide access to the latches 112, 114 and 116 (when the cover shield 106 is open). As shown in FIG. 2A, the flexible hinge 108 provides rotation of the cover shield 106 out of the way when access to the latches 112, 114 and 116 of the electronics enclosure 100 is necessary. The solar shield system shown in FIG. 2B, showing the cover shield 106 in a closed position, comprises a solar radiation dispersion area that provides suitable radiation protection for the electronics enclosure 100 while protecting the latches 112, 114, and 116. In one implementation, the material for the cover shield 106 comprises a flexible polyester vinyl chloride material, or other similar material. The flexible hinge 108 is formed by a profile feature integrated within the solar shield material of cover shield 106 that decreases in thickness from a first section having a first thickness to a second section having a second thickness (as shown in further detail below with respect to FIG. 3A). In one embodiment, the solar shield material and the flexible hinge material for the cover shield 106 are extruded in a single extrusion process. In an alternate embodiment, solar shields $104_1$ and $104_2$ and cover shield 106 are comprised of an extruded metal. In one such alternate embodiment, the flexible material for the flexible hinge 108 comprises a bonded flexible material such as, but not limited to, a rubber compound.

As illustrated in FIGS. 3A to 3C, solar shields $104_1$ and $104_2$ and cover shield 106 each include one or more snap-fit features that engage with attachment channels on access panels $103_1$ and $103_2$ in order to fasten solar shields $104_1$ and $104_2$ and cover shield 106 onto enclosure 100. FIGS. 3A to 3C are plan views of an embodiment of the electronics enclosure 100 as viewed from the top plate 110 of FIG. 1. FIG. 3A is a detailed view of Detail 'A' of FIG. 3C, and FIG. 3B is a detailed view of Detail 'B' of FIG. 3C.

The side shields $104_1$ and $104_2$ and the cover shield 106 each include extruded snap-fit features which are positioned to align with the attachment channels $118_{1-4}$ of enclosure 100. As shown in FIG. 3A, the one or more attachment channels $118_{1-4}$ are used to properly position side shields $104_1$ and $104_2$ onto enclosure 100. Once in place, fastening devices such as, but not limited to screw fixtures 122 are used to securely attach the shields onto the attachment channels $118_{1-4}$ by engaging the screw fixtures 122 into the inner channel walls of the attachment channels $118_{1-4}$. In one embodiment, screw fixtures 122 are self-drilling, self-taping fasteners which are screwed directly into attachment channels $118_{1-4}$ as described in the '1039 application.

In order to couple cover shield 106 with side shield $104_2$, cover shield 106 also includes tabs 304 which engage with snap-fit feature 310 of side shield $104_2$. Screw fixtures 122 secures side shield $104_2$ and cover shield 106 to channel $118_2$ with the non-pivoting section of cover shield 106 sandwiched in between side shield $104_2$ and channel $118_2$, thus securing the non-pivoting side of hinge 108 to enclosure 100. As discussed above, cover shield 106 comprises a flexible profile integrated within the solar shield material that decreases in thickness from a first section having a first thickness to a second section having a second thickness to form the flexible hinge 108. In one implementation, the tab members 304 are co-extruded with the flexible hinge material of the cover shield 106.

Side shields $104_1$ and $104_2$ are further attached to the access panels $103_1$ and $103_2$ using the extruded snap-fit features shown generally at $308_1$ and $308_2$. Snap-fit features $308_1$ and $308_2$ align with attachment channels $118_4$ and $118_3$ to properly position side shields $104_1$ and $104_2$. Screw fixtures 122 thread into the attachment channels $118_4$ and $118_3$ to secure side shields $104_1$ and $104_2$ onto enclosure 100. In one implementation, the side shields $104_1$ and $104_2$ extend from the attachment channels $118_1$ and $118_2$ to the hinges $109_1$ and $109_2$ of the frame 102, respectively.

FIG. 3B illustrates a snap-fit closure feature 302 and a snap-fit keeper 306 for securing the cover shield 106 in to closed position shown in FIG. 2B. The snap-fit closure feature 302 and the snap-fit keeper 306 secure the cover shield 106 to the access panel $103_1$. To access the latches behind the cover shield 106 via the snap-fit closure feature 302, the snap-fit closure feature 302 acts as a cam to rotatably open the cover shield 106 away and over (from the enclosure 100) using the flexible hinge 108. Once the cover shield 106 is opened, a user has access to all the latches behind the cover shield 106.

In the particular embodiment shown in FIG. 2B, solar shields $104_1$ and $104_2$ when installed form a generally "U"-shaped profile with the cover shield 106 attached adjacent to at least one of the first and second solar shields 104 to complete the solar shield system. As shown in FIG. 2A, the cover shield 106 extends across an access opening between access panels $103_1$ and $103_2$ when the pair of access panels $103_1$ and $103_2$ are latched closed, and further covers and protects the access latches 112, 114, and 116 from the environment as well as potential tampering. In one embodiment, when cover shield 106 opens, an outside skin of the cover shield 106 hardens along a seam of the flexible hinge 108 without reaching a particular strain-hardening point. The above-described properties of the flexible hinge 108 provide for opening and closing the cover shield 106 multiple times.

Figure 4:
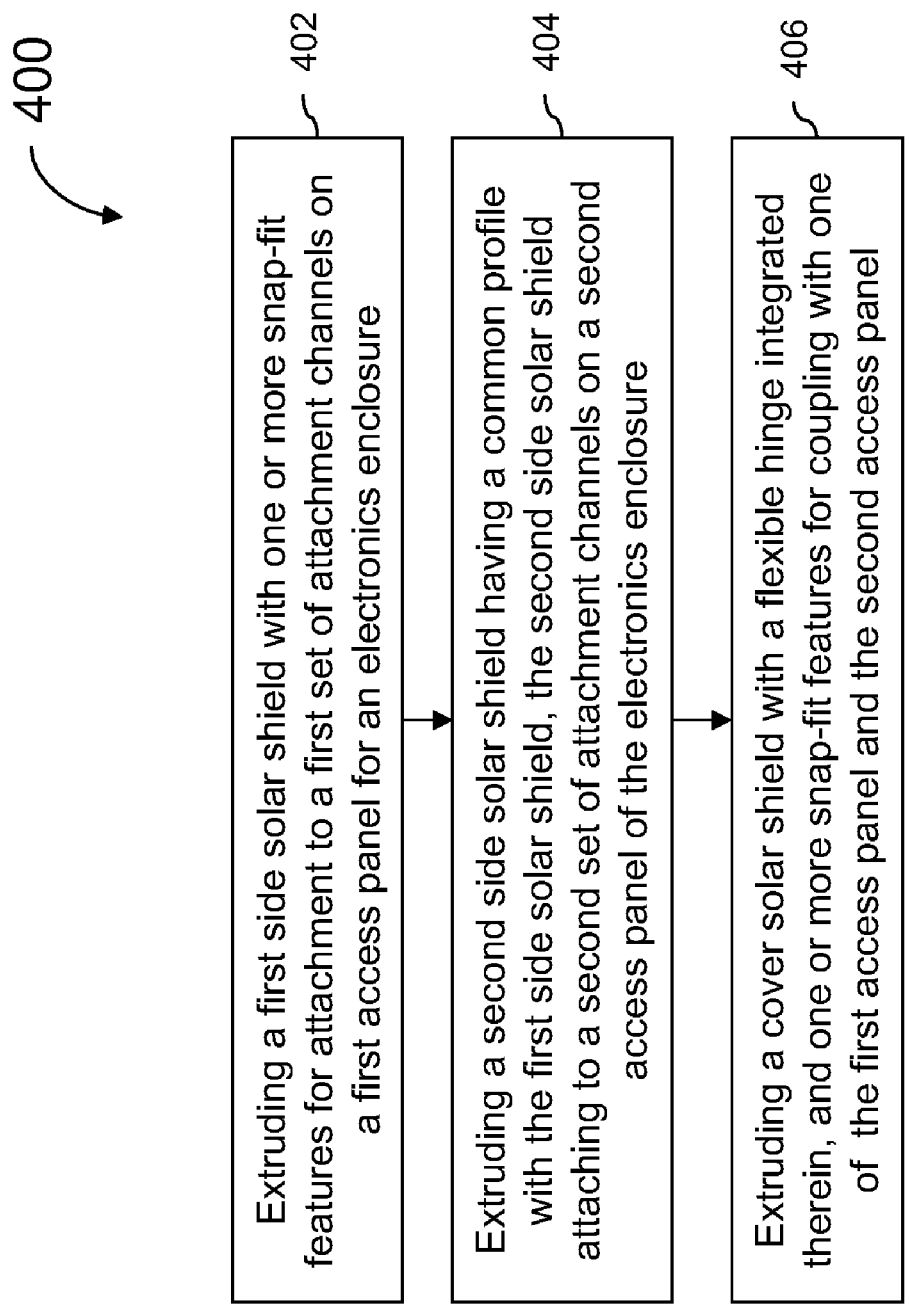
FIG. 4 is a flow diagram of an embodiment of a method for providing a solar shield system for an outdoor electronics enclosure.

FIG. 4 is a flow diagram of an embodiment of a method 400 for providing a solar shield system for an outdoor electronics enclosure. The method 400 addresses providing solar shields that attach to the exterior of the outdoor electronics enclosure using one or more snap-fit features. The solar shield system further comprises a flexible hinge system that provides for convenient access to electronic components housed within the outdoor electronics enclosure when necessary.

The method begins at 402 with extruding a first side solar shield with one or more snap-fit features for attachment to a first set of attachment channels on a first access panel for an electronics enclosure. In one implementation, the method extrudes the first side solar shield to match a profile of the first access panel and extend around and over one or more edges of an outer surface of the first access panel. The method proceeds at 404 with extruding a second side solar shield having a common profile with the first side solar shield, the second side solar shield attaching to a second set of attachment channels on a second access panel of the electronics enclosure. The second side solar shield attaches to a second set of attachment channels on a second access panel of the electronics enclosure. At block 406, the method continues with extruding a cover solar shield with a flexible hinge integrated therein, and one or more snap-fit features for coupling with one of the first access panel and the second access panel. The cover solar shield engages with the first access panel and the second access panel of the outdoor electronics enclosure to protect the access panels from external environmental conditions. In one implementation, the extruded cover solar shield further comprises extruded flexible tab members to aid in securing the extruded cover solar shield to the second access panel. In a similar implementation, the extruded cover solar shield comprises a snap-fit closure feature extruded for a snap-fit keeper extruded on the first access panel to secure the cover solar shield to the first access panel.

This description has been presented for purposes of illustration, and is not intended to be exhaustive or limited to the embodiments disclosed. The embodiments disclosed are intended to cover any modifications, adaptations, or variations, which fall within the scope of the following claims.

What is claimed is:

1. A solar shield system, comprising:
   at least one solar shield having a first set of snap-fit features positioned on the first solar shield to engage with attachment channels of an enclosure;
   at least one solar shield cover having a flexible hinge integrated therein, the at least one solar shield cover further comprising a second set of snap-fit features for coupling the at least one solar shield cover with the at least one solar shield; and
   a plurality of fastening devices for securing the at least one solar shield and the at least one solar shield cover to the attachment channels of the enclosure.

2. The solar shield system of claim 1, wherein the at least one solar shield and the at least one solar shield cover are extruded components.

3. The solar shield system of claim 1, wherein the plurality of fastening devices are screw fixtures.

4. The solar shield system of claim 3, wherein the screw fixtures are self-drilling, self-taping screw fixtures.

5. The solar shield system of claim 1, wherein the at least one solar shield comprises two extruded solar shields having a common profile.

6. The solar shield system of claim 1, wherein a profile of the at least one solar shield is based on following an exterior surface profile of an access panels of the enclosure.

7. The solar shield system of claim 1, further comprising:
   a first extruded solar shield for attaching to a first access panel of the enclosure; and a second extruded solar shield for attaching to a second access panel of the enclosure;
   wherein each of the first extruded solar shield and the second extruded solar shield are secured to the attachment channels of the enclosure using screw fixtures installed through the snap-fit features.

8. The solar shield system of claim 1, further comprising a set of flexible tab members extruded on the at least one solar shield cover to aid in securing the at least one solar shield cover with the at least one solar shield to an access panel of the enclosure.

9. The solar shield system of claim 1, wherein the at least one solar shield cover and the at least one solar shield comprises one of an extruded plastic material and an extruded metal.

10. The solar shield system of claim 1, wherein the at least one solar shield cover and the flexible hinge comprise material extruded in a single extrusion process.

11. The solar shield system of claim 1, wherein the flexible hinge comprises a flexible material having a profile feature within the at least one solar shield cover that decreases in thickness from a first section having a first thickness to a second section having a second thickness.

12. The solar shield system of claim 1, wherein the flexible hinge comprises one of a polyester vinyl chloride material and a rubber compound material.

13. The solar shield system of claim 1, wherein the at least one solar shield cover further comprises a snap-fit closure feature, the snap-fit closure feature secured by a snap-fit keeper on at least one of the access panels.

14. The solar shield system of claim 1, wherein the at least one solar shield cover attaches adjacent to the at least one solar shield such that when installed on the enclosure, the solar shield cover protects one or more access latches for the enclosure.

* * * * *